June 17, 1924.

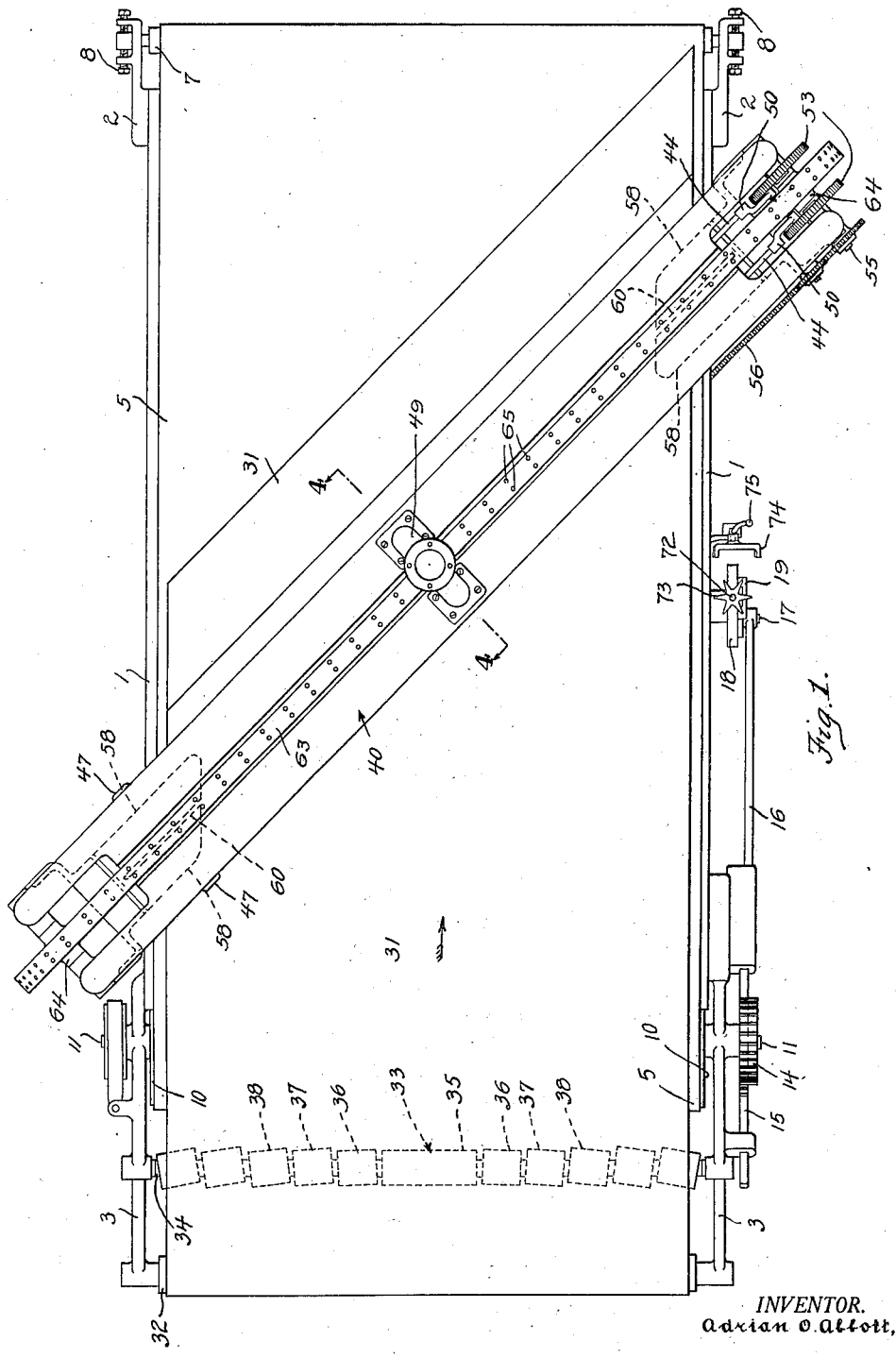

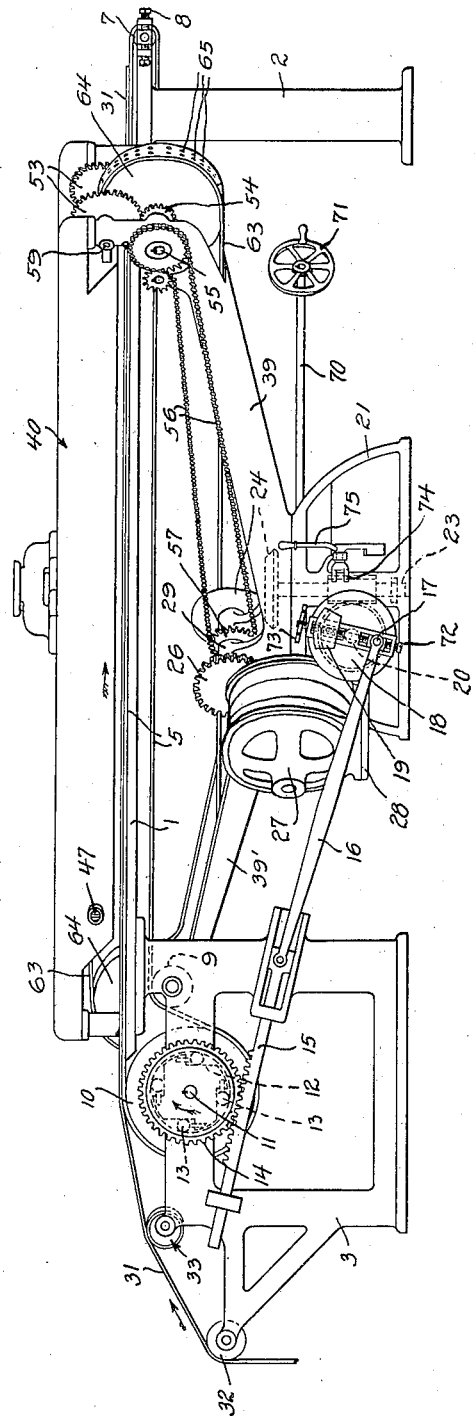

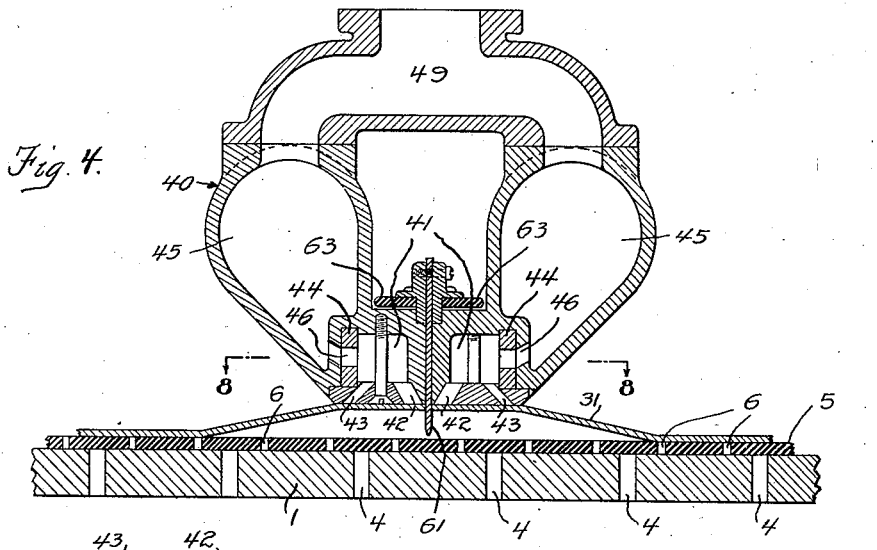
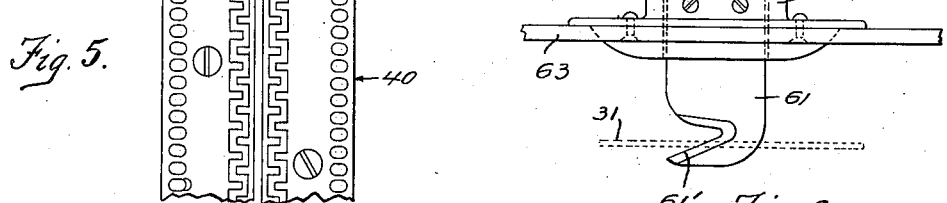
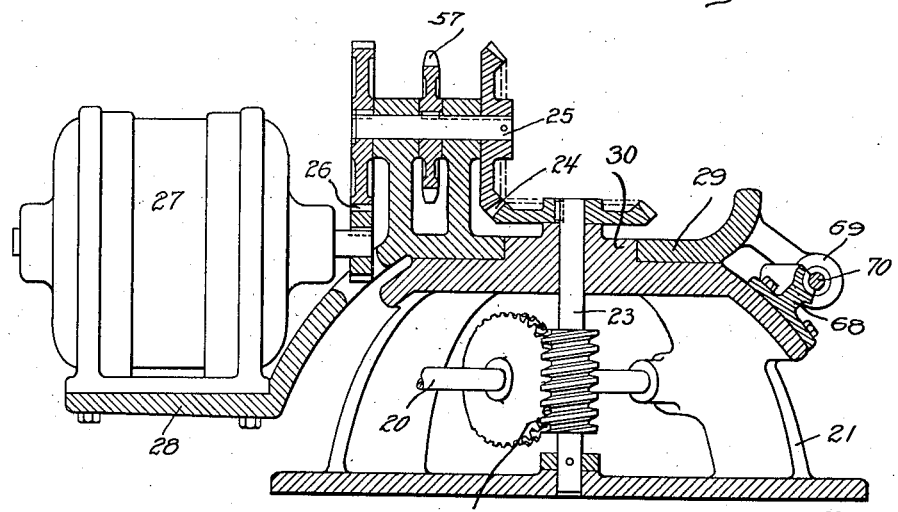

A. O. ABBOTT, JR 1,497,765

CUTTING MACHINE

Filed Feb. 25, 1921        4 Sheets-Sheet 4

INVENTOR.
Adrian O. Abbott, Jr.

BY Ernest Hopkinson his ATTORNEY.

Patented June 17, 1924.

1,497,765

UNITED STATES PATENT OFFICE.

ADRIAN O. ABBOTT, JR., OF DETROIT, MICHIGAN, ASSIGNOR TO MORGAN & WRIGHT, A CORPORATION OF MICHIGAN.

CUTTING MACHINE.

Application filed February 25, 1921. Serial No. 447,723.

*To all whom it may concern:*

Be it known that I, ADRIAN O. ABBOTT, Jr., a citizen of the United States, residing at Detroit, county of Wayne, and State of Michigan, have invented new and useful Improvements in Cutting Machines, of which the following is a full, clear, and exact description.

This invention relates to cutting machines in general, and more particularly to a type thereof suitable for cutting fabric into plies that are to be incorporated in pneumatic tires.

Prior machines for this work have either employed reciprocatory grippers to draw the rubberized fabric over a stationary bed and present it to a shearing cutter (generally in conjunction with a belt to convey the fabric to the table, or to take it away from the table after being cut) or they have employed gravity to feed the fabric to the cutter. In the first case, the fabric travels horizontally while in the latter it travels vertically downward. Both types of machines have been found objectionable. The fabric is distorted so that the cut edges of the strips are not exactly parallel, and to correct this distortion the fabric often has to be handled and readjusted for each cut. While in some of the former machines the fabrics could be cut properly when of relatively stiff material, they would not handle light or thin fabrics which were easily distorted or rumpled up. Further, in the manufacture of tires, the fabric is subjected to an expensive rubberizing treatment. And where the output is 25,000 tires, as many as 150,000 strips or plies may have to be cut daily. If the cut edges of these strips are not exactly parallel, and are not of the exact width, the loss by wastage through the necessary trimming to exact size is considerable.

The present invention aims to improve upon prior cutting machines by enabling strips to be cut with their edges more nearly, if not exactly parallel, to increase the cutting capacity of a single machine, to reduce loss by wastage, and to generally provide the trade with a more satisfactory machine of this type.

With the embodiment of the invention illustrated in the drawings in mind, and without intention to limit the invention more than is required by the prior art, it may be said to consist in a machine having a step by step feed belt on which the fabric is sustained and advanced, a pneumatic head located immediately above the path of the fabric and adapted by passage of air through openings in its lower face to lift the fabric throughout its width and hold it while a knife is swiped transversely to sever the fabric into strips of a width predetermined by the step by step advance of the feed conveyor or belt, the knife being carried by an endless belt encircling the feed belt.

The invention is illustrated in the accompanying drawings, in which—

Figures 1 and 2 are plan and side elevations of a machine embodying the invention;

Fig. 3 is a detail showing a preferred form of smoothing roller;

Fig. 4 is a transverse section on the line 4—4, Fig. 1, showing a pneumatic head by which the fabric is at times adapted to be held;

Fig. 5 represents in bottom plan a suitable arrangement of openings in the lower face of the pneumatic head shown in Fig. 4;

Fig. 6 in side elevation shows a preferred form of knife;

Fig. 7 is a vertical section through the central base by which the pneumatic head and cutter are shiftably supported for adjustment at various angles to the length of the machine.

Figure 8:
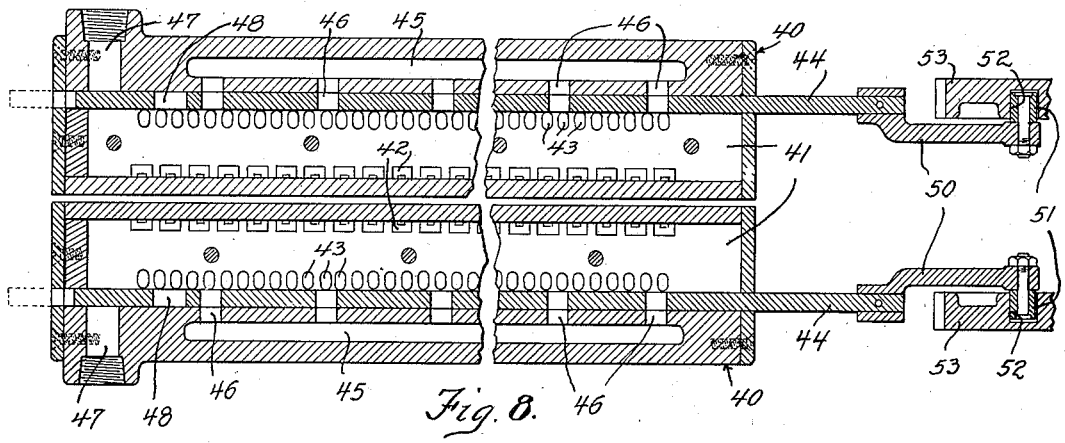
Figures 9, 10:
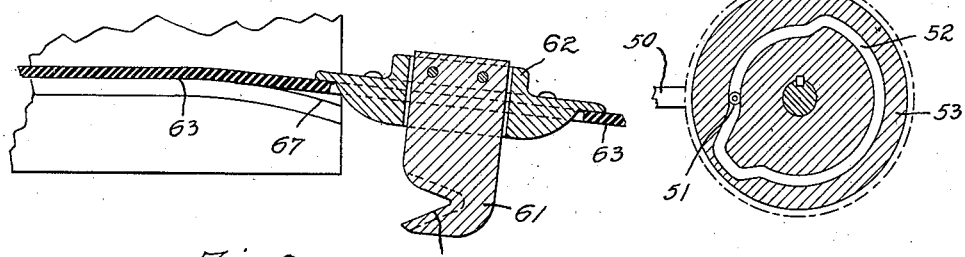
Figure 11:
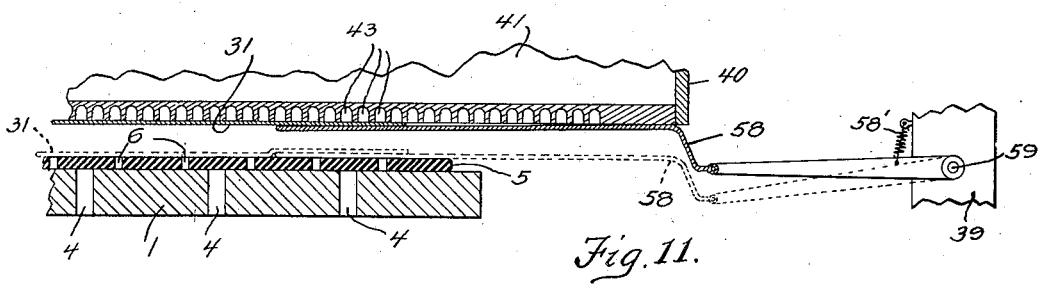
Figure 12:
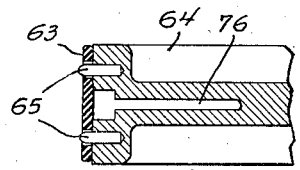

Fig. 8 is a section on the line 8—8, Fig. 4;

Fig. 9 illustrates the knife in a position about to enter a guide-way or slot formed in the casting of the pneumatic head;

Fig. 10 illustrates one of the cams for governing the action of one of the two air valves appearing in Fig. 8;

Fig. 11 shows in cross section a shutter for closing downwardly directed openings in the pneumatic head that may not be covered by the fabric being cut, and Fig. 12 is a detail in cross section of a pulley for the knife carrying belt.

In the embodiment of the invention illustrated in the drawings, a table 1 is supported at its ends by standards or frames 2 and 3 respectively. At suitable intervals apertures 4 are provided in the table for a purpose which will hereinafter appear.

While any suitable means may be employed to feed the fabric, it is preferred to use a conveyor in the form of an endless belt 5 preferably of rubberized material apertured at intervals as indicated at 6. The belt 5 is arranged lengthwise the table which it encircles to provide a feeding flight over its top and a return flight therebeneath. At one end of the table is provided a roller 7 which is adjustable as indicated at 8 to permit taking up slack. At the opposite end of and below the table the belt passes over an idler 9 and around a relatively large roll 10 which is adapted to be rotated in the direction indicated by the arrow about the shaft 11 to which it is keyed. Also keyed to the shaft 11 is the driven member 12 of a clutch having spring-pressed rolls 13 which are adapted to establish frictional driving relation between the part 12 and a driving member 14 when the latter is turned in the direction of the arrow. Driving member 14 is provided externally with teeth which mesh with a rack 15 that is suitably supported and guided by lugs integral with the frame 3. The rack 15 is reciprocated by a pitman 16 which is driven by an adjustable crank pin 17 on driving disc 18 counter-weighted as indicated at 19. The disc 18 is fixed to a shaft 20 which as shown in Fig. 7 is suitably journaled in a central base or pedestal 21. Through the worm gear indicated at 22, the shaft 20 is driven from a vertical shaft 23 which by bevel gearing 24, shaft 25, and gears 26 is rotated by the motor 27, the motor being supported on a platform 28 integral with the casting 29 that is swiveled to the circular boss 30 at the top of the pedestal 21 for adjustment purposes. Rotation of the motor 27 will therefore result in reciprocating the rack 15 which will advance the belt 5 step by step in the direction indicated in Fig. 2 without any retrograde movement.

From a roll or other source of supply the fabric 31 passes over a guide roll 32 and thence preferably but not necessarily over a smoothing roll 33 which is designed to remove wrinkles from the fabric before it reaches the belt 5. While any suitable device may be used for this purpose, the construction shown in detail in Fig. 3 is preferred. This comprises a fixed shaft 34 rotatably supporting a plurality of rolls, the central one 35, of which, is concentric and coaxial with the shaft while the successive flanking rolls 36, 37, 38, etc., on opposite sides of the central roll 35 are canted more and more to the axis of the shaft 34 as more specifically disclosed in the pending application of Hector V. Lough, Serial No. 429,524, filed December 9, 1920. From the smoothing roll 33 the fabric passes on to the belt 5 and is sustained and supported by the latter in its passage to and from the cutting mechanism which is located at an angle to the direction of feed and passes through substantially the central vertical axis of the machine.

Integral with or otherwise suitably fixed to the casting 29 are a pair of arms 39 and 39' which extend laterally to the sides of the table where they are forked and bent upwardly to provide a support for a hollow pneumatic head indicated generally by the numeral 40. The pneumatic head 40 consists of duplicate hollow chambers 41 whose lower walls are apertured to pass air. Slide valves 44 are provided in each of the hollow chambers 41 to govern exhaust of air therefrom into flanking auxiliary chambers 45 through ports 46 in their walls or to provide for the admission of air under pressure from a compressed air line 47 through the passages 48. The auxiliary exhaust chambers 45 are connected through a manifold 49 to an exhaust line.

The slide valves 44 may be operated in any suitable manner and at any suitable times preferably being shifted to place the chambers 41 in communication with the exhaust line at the end of the feeding movement of the fabric to maintain the vacuous condition until the fabric has been cut. Just prior to the next succeeding advance of the fabric, the vacuum in chambers 41 is replaced by admitting compressed air thereinto. This desirable timing of the movement of the slide valves 44 may be effected by the construction illustrated in Figs. 8 and 10. Offset extensions 50 of the slide valves 44 carry rolls or followers 51 which are adapted to travel in grooves 52 provided in each of two cams 53 which as shown in Fig. 2 have their toothed peripheries in engagement with gears 54 on one of the shafts 55 that is adapted to be driven by a chain 56 from a sprocket 57 on the shaft 25 previously mentioned that is driven by the motor 27. Between the step by step feeding movement of the fabric conveying belt, it will therefore be understood that the fabric 31 may be lifted the relatively short distance illustrated in Fig. 4 by suction and held lifted until the next feeding movement of the fabric is about to occur, when the vacuum is broken, and preferably but not necessarily then blown back upon the feed belt by admission of compressed air to the chambers 41.

The machine is preferably designed to handle all widths of fabric, and when the fabric is narrow and does not completely cover the openings 42–43 in the bottom of the pneumatic head, it is desirable to substantially if not completely close off the uncovered openings so as to maintain as strong a suction as practical. For this purpose, the shutters 58 of suitable sheet material such as aluminum are removably hinged as indicated at 59 to the upper extremities of the supporting arms 39. These shutters are slit longitudinally as at 60 to pass the knife 61, and supported horizontal by a light spring 58'. Preferably they terminate an inch within the edges of the fabric. Pairs may be mounted for different widths of fabric.

The cutting mechanism comprises a knife or cutting blade 61 suitably fixed to a shoe 62 which has flanges riveted or otherwise secured to an endless belt 63. The belt 63 passes around two pulleys 64 which are keyed to the shafts 55 suitably journaled in the forked extremities of each of the arms 39. The shaft 55 shown at the right of Fig. 2 is driven by the chain 56 and sprocket 57 as hereinbefore described. As each of the pulleys 64 is provided with studs 65 that enter holes in the belt 63, the knife 61 may be continuously moved in an endless path in definite cyclic relation to the fabric feed belt. The knife carrying belt 63 passes between the auxiliary chambers 45 and above the air chambers 41, the latter being spaced apart to define a guide-way for the knife 61. When the fabric has been fed forward a predetermined distance and after it has been lifted by suction against the bottom face of the pneumatic head, the continuously moved knife enters the flaring mouth 67 provided at the entrance of the guide-way between the chambers 41 and engages the fabric in the manner illustrated in Fig. 6. The cutting edge of the knife indicated at 61' is preferably inclined as shown so as to cooperate with the contiguous or flanking portions of the pneumatic head to sever the fabric, the pneumatic head acting somewhat as the ledger blade of an ordinary shearing machine.

The casting 29, constituting the supporting base of the pneumatic head and of the cutting mechanism and carrying in fixed driving relation therewith the motor 27 and interconnecting actuating devices, is adjustably mounted on the pedestal 21. To conveniently effect this adjustment a section of a worm wheel 68 is fixed to the pedestal 21 in cooperative relation with a worm 69 on a shaft 70 operable by a conveniently disposed hand wheel 71.

By suitably proportioning the component parts of the machine, it will be obvious that fabric may be advanced step by step to permit cutting it into strips of predetermined width with their cut edges parallel. It has been found that by using air to lift the fabric and hold it against the bottom of the pneumatic head which is spaced in close parallelism to the upper face of the fabric, that a negligibly small fraction of an inch only is required to furnish the fullness or bag in the fabric to permit of its elevation and that such fullness or bag is distributed equally on opposite sides of the cutting line. In other words, with the construction of the present invention, strips may be cut from a great length of fabric with their edges exactly parallel, and by suitable adjustment of the step by step feed the exact cut width desired may be obtained.

To permit adjustment of the feed without stopping the operation of the machine or rectification of an adjustment at the beginning of a job, a right and left handed screw 72 on the crank disc 18 is provided with a star-wheel 73 which may be intermittently engaged by one of two arms 74 on a counter-weighted hand lever 75 so as to turn the screw 72 in one direction. This of course varies the stroke of the rack 15 and the effective feeding movement of the belt 5.

Operation: The motor 27 is started and fabric 31 passed over rolls 32 and 33 on to the belt 5 to which it adheres more or less, especially if its surface has been rubberized. The fabric is advanced step by step to the cutting line, and the cut strips carried away to the rear end of the machine where they may be disposed of in any suitable manner. Assuming the full width of fabric is in the cutting line, and that the feed has ceased, the valves 44 are operated to establish communication between the auxiliary exhaust chambers 45 and the main exhaust chambers 41, the latter in their exhaustion drawing air through the fabric and apertures in the belt 5 and table 1 so rapidly as to lift the fabric 31 up against the bottom face of the pneumatic head and hold it there. While so held, the cutter 61 enters the flaring mouth 67 of the guide-way in the pneumatic head and cuts the fabric from one side to the other. No movement of the fabric occurs during the cutting operation. When the fabric has been completely severed transversely and the knife passed beyond its edge, valves 44 are shifted automatically by the cams 53 to close the ports 46. Preferably the valves 44 are shifted far enough not only to close the ports 46 but also to establish communication between the ports 48 in the valves 44 and the compressed air line 47, in which case of course, the air rushes through the chambers 41 and down through the openings 42 and 43 so as to blow the fabric away from the pneumatic head and down upon the belt 5. About this time the clutch parts 12 and 14 are frictionally engaged to start the next feeding movement of the fabric, and while this feeding movement occurs the knife passes around and under the feed belt, the knife belt pulleys 64 being suitably channeled as indicated at 76 to permit such movement of the inwardly directed knife.

While the foregoing relates to the preferred construction, it will be understood that many changes may be made without departing from the underlying principles of the invention. By reason of the relatively short length of the feed belt, and also by reason of the continuous operation of the knife, the machine can be operated quite rapidly. It is regarded as broadly new to cut the fabric without substantially moving it or shifting it from a supporting feed belt that carries it to as well as from the cutting line. It is also believed to be broadly new to employ pneumatic devices to lift and hold the fabric while it is being cut. And still further, it is believed entirely new to employ pneumatic devices to blow the fabric away back upon the belt after a strip has been cut. For a more exact understanding of the limits of the present invention, reference should therefore be made to the accompanying claims defining its scope.

Having thus described my invention, what I claim and desire to protect by Letters Patent is:

1. A cutting machine having in combination, means for advancing the fabric step by step and means for transversely severing the fabric intermediate its advancing steps into strips including a cutter movable in an endless path a portion of which intersects the fabric being advanced.

2. In a cutting machine, in combination, an intermittently movable conveying belt for advancing fabric, means for intermittently holding the fabric, and means for cutting the farbic transversely including a cutting blade movable in an endless path a portion of which intersects the fabric.

3. In a cutting machine, in combination, an intermittently movable belt for feeding fabric, vacuous means for intermittently holding the fabric, and means for cutting the fabric transversely including a cutting blade movable in an endless path a portion of which intersects the fabric.

4. In a cutting machine, in combination, an intermittently movable belt for advancing fabric, vacuous means for intermittently holding the fabric, means for cutting the fabric transversely including a cutting blade movable in an endless path a portion of which intersects the fabric, and means for releasing the fabric from the holding means.

5. In a cutting machine, in combination, fabric feeding means, fabric cutting means, and means for intermittently lifting and holding the fabric lifted while being cut.

6. In a cutting machine, in combination, fabric feeding means, fabric cutting means, and pneumatic means for lifting and holding the fabric while being cut.

7. In a cutting machine, in combination, fabric feeding means, fabric cutting means, and suction devices for intermittently lifting and holding the fabric while being cut.

8. In a cutting machine, in combination, fabric feeding means, fabric cutting means, and means for intermittently lifting and holding the fabric lifted while being cut including suction devices disposed transversely of the direction in which the fabric is fed.

9. In a cutting machine, in combination, fabric feeding means including an endless conveyor, fabric cutting means including a knife and an endless carrier for the knife encircling the conveyor, and means for lifting fabric clear of the conveyor and in the path of the knife for permitting severance thereof into strips.

10. In a cutting machine, in combination, fabric feeding means including an endless conveyor, fabric cutting means including a knife and an endless carrier for the knife encircling the conveyor, and suction devices for lifting fabric clear of the conveyor and in the path of the knife for permitting severance thereof into strips.

11. In a cutting machine, in combination, fabric feeding means, fabric cutting means including a knife, and means for holding the fabric clear of the feeding means and in the path of the knife and for replacing the fabric on the feeding means after severance by the knife.

12. In a cutting machine, in combination, fabric feeding means, fabric cutting means including a knife, and pneumatic means for holding the fabric clear of the feeding means and in the path of the knife and for replacing the fabric on the feeding means after severance by the knife.

13. In a cutting machine, in combination, fabric feeding mechanism, fabric cutting mechanism, and fabric holding mechanism including pneumatic devices adjacent the cutting path and immediately above the path of the fabric.

14. In a cutting machine, in combination, fabric feeding mechanism, fabric cutting mechanism, and fabric holding mechanism including automatically operated pneumatic devices for shifting the fabric locally before and after severance.

15. In a cutting machine, in combination, fabric feeding mechanism, fabric cutting mechanism including a knife movable transversely of the direction of feed in a prescribed path, and fabric holding mechanism including pneumatic means for holding the fabric on opposite sides of the path of the knife and from above its plane of feed.

16. In a cutting machine, in combination, fabric feeding mechanism, fabric cutting mechanism including a knife movable transversely of the direction of feed in a prescribed path, and fabric holding mechanism including a hollow member arranged lengthwise and adjacent the prescribed path of the knife, said hollow member being provided with openings in its bottom face which are in communication with its interior, and means for passing air through the openings and hollow member to pneumatically hold fabric while it is being cut.

17. In a cutting machine, in combination, fabric feeding mechanism, fabric cutting mechanism including a knife movable transversely of the direction of feed in a prescribed path, and fabric holding mechanism including hollow chambers on opposite sides of the cutting path of the knife which are provided with downwardly directed openings, an evacuating line, valves for placing the chambers in communication with the evacuating line, and means for automatically operating said valves to lift and release fabric before and after a cutting stroke of the knife.

18. In a cutting machine, in combination, fabric feeding mechanism, fabric cutting mechanism including a knife movable transversely of the direction of feed, and fabric holding mechanism including hollow chambers flanking the cutting path of the knife, and pneumatic means for alternately lifting and thrusting fabric toward and away from the chambers whereby to permit severance of the fabric without interference with the feeding mechanism.

19. In a cutting machine, in combination, fabric feeding mechanism, fabric cutting mechanism including a knife movable transversely of the direction of feed, and fabric holding mechanism including chambers flanking a portion of the path of the knife and provided with ports in their lower faces, compressed air and exhaust lines, valves governing communication between the chambers and lines, and means for operating the valves at predetermined times in cyclical relation to the cutting and feeding mechanism.

20. In a cutting machine, in combination, fabric feeding mechanism, fabric cutting mechanism including an endless belt carrying a knife movable transversely of the direction of feed, and fabric holding mechanism including air chambers provided with downwardly directed openings and spaced apart to receive and guide the knife during its cutting action, and means for pneumatically lifting the fabric against the bottoms of said chambers and holding it during a cutting stroke of the knife.

21. In a cutting machine, in combination, fabric feeding mechanism, fabric cutting mechanism including a knife movable transversely of the direction of feed, and fabric holding mechanism including air chambers flanking the knife at opposite sides of its cutting path and provided in their bottom walls with openings, means for passing air through said openings at predetermined times, and means for at least partially closing off any openings in the bottoms of the chambers not covered by the fabric being cut.

22. In a cutting machine, in combination, fabric feeding mechanism, fabric holding mechanism, and fabric cutting mechanism including an endless carrier disposed transversely the direction of feed, and a knife sustained on the inner face of said endless carrier, said endless carrier encircling the path in which the fabric is fed.

23. In a cutting machine, in combination, fabric feeding mechanism, fabric holding mechanism including suction devices for intermittently lifting the fabric, an endless carrier encircling the path in which the fabric is fed, and a knife adapted to sever the fabric lifted by the suction devices, said knife being adapted to cooperate with the portions of the suction devices flanking its path.

24. In a cutting machine, in combination, fabric feeding mechanism, including an endless belt movable step by step, fabric holding mechanism including devices for lifting and holding the devices between its advancing steps, fabric cutting mechanism including an endless carrier completely encircling the endless belt and sustaining an inwardly directed knife, and means for moving the knife carrier continuously in the path of the fabric when lifted.

25. In a cutting machine, in combination, fabric cutting mechanism, fabric feeding mechanism including an endless belt movable step by step, and fabric holding mechanism including pneumatic devices for lifting, holding, and releasing the fabric at predetermined times in a cycle of cutting operations.

26. In a cutting machine, in combination, fabric feeding mechanism including an endless belt movable step by step, fabric holding mechanism including pneumatic devices operable intermittently in sequential relation to the feeding mechanism, fabric cutting mechanism including a cutting member, and a common adjustable support for the pneumatic devices and fabric cutting mechanism whereby to permit strips being cut at various angles.

Signed at Detroit, county of Wayne, State of Michigan, this 17th day of February, 1921.

ADRIAN O. ABBOTT, Jr.